(12) United States Patent
Zheng

(10) Patent No.: US 8,070,999 B2
(45) Date of Patent: Dec. 6, 2011

(54) SOLUTION CASTING PROCESS

(75) Inventor: Zhongde Zheng, Beijing (CN)

(73) Assignee: Golden Energy Fuel Cell Co., Ltd., Beijing (CN)

( * ) Notice: Subject to any disclaimer, the term of this patent is extended or adjusted under 35 U.S.C. 154(b) by 338 days.

(21) Appl. No.: 12/376,554

(22) PCT Filed: Aug. 11, 2006

(86) PCT No.: PCT/CN2006/002033

§ 371 (c)(1),
(2), (4) Date: Feb. 5, 2009

(87) PCT Pub. No.: WO2008/019532

PCT Pub. Date: Feb. 21, 2008

(65) Prior Publication Data

US 2010/0176537 A1    Jul. 15, 2010

(51) Int. Cl.
*B29C 39/38* (2006.01)
(52) U.S. Cl. .................. 264/212; 264/216; 264/331.14
(58) Field of Classification Search ............... 264/212, 264/216, 331.14
See application file for complete search history.

(56) References Cited

U.S. PATENT DOCUMENTS

| | | | |
|---|---|---|---|
| 4,248,913 A | 2/1981 | Jakabhazy et al. | |
| 5,417,832 A | 5/1995 | Pellegrino et al. | |
| 5,746,917 A * | 5/1998 | Altmeier ................. | 210/500.37 |
| 2002/0135087 A1 * | 9/2002 | Yapel et al. ................ | 264/40.1 |

FOREIGN PATENT DOCUMENTS

| | | | |
|---|---|---|---|
| CN | 1330425 A | | 1/2002 |
| CN | 2602917 Y | * | 2/2004 |
| CN | 2602917 Y | | 2/2004 |

OTHER PUBLICATIONS

International Search Report of PCT/CN2006/002033, dated Apr. 26, 2007.

* cited by examiner

*Primary Examiner* — Christina Johnson
*Assistant Examiner* — Xue Liu
(74) *Attorney, Agent, or Firm* — Hamre, Schumann, Mueller & Larson, P.C.

(57) ABSTRACT

A static and closed solution casting process comprises the following steps: dissolve a solute in a solvent to prepare a casting solution; place membrane-casting plate on bracket, and adjust the bracket to make the membrane-casting plate horizontal; pour the casting solution into membrane-casting plate such that the casting solution is uniformly spread out in the membrane-casting plate; arrange heating arrangement over the membrane-casting plate; arrange cooling side plate around the membrane-casting plate; arrange cooling bottom plate below the membrane-casting plate; supply cooling liquor to the connected interlayer of the cooling side plate and the cooling bottom plate; enclose the membrane-casting plate, the bracket, the heating arrangement, the cooling side plate and the cooling bottom plate inside an insulated case made by heat insulator; heat the casting solution in the membrane-casting plate by driving the heating arrangement to totally evaporate the solvent in the casting solution; and then continuously heat in order to enhance the crystallinity of the final membrane; stop heating; and remove the condensed solvent from the cooling bottom plate and peel the final membrane from the membrane-casting plate. This process is of simple technique, cheap equipment and low cost of membrane preparation, and the final membrane has the advantages such as high crystallinity and isotropic etc.

6 Claims, 5 Drawing Sheets

SOLUTION CASTING PROCESS

TECHNICAL FIELD

Figure 1:
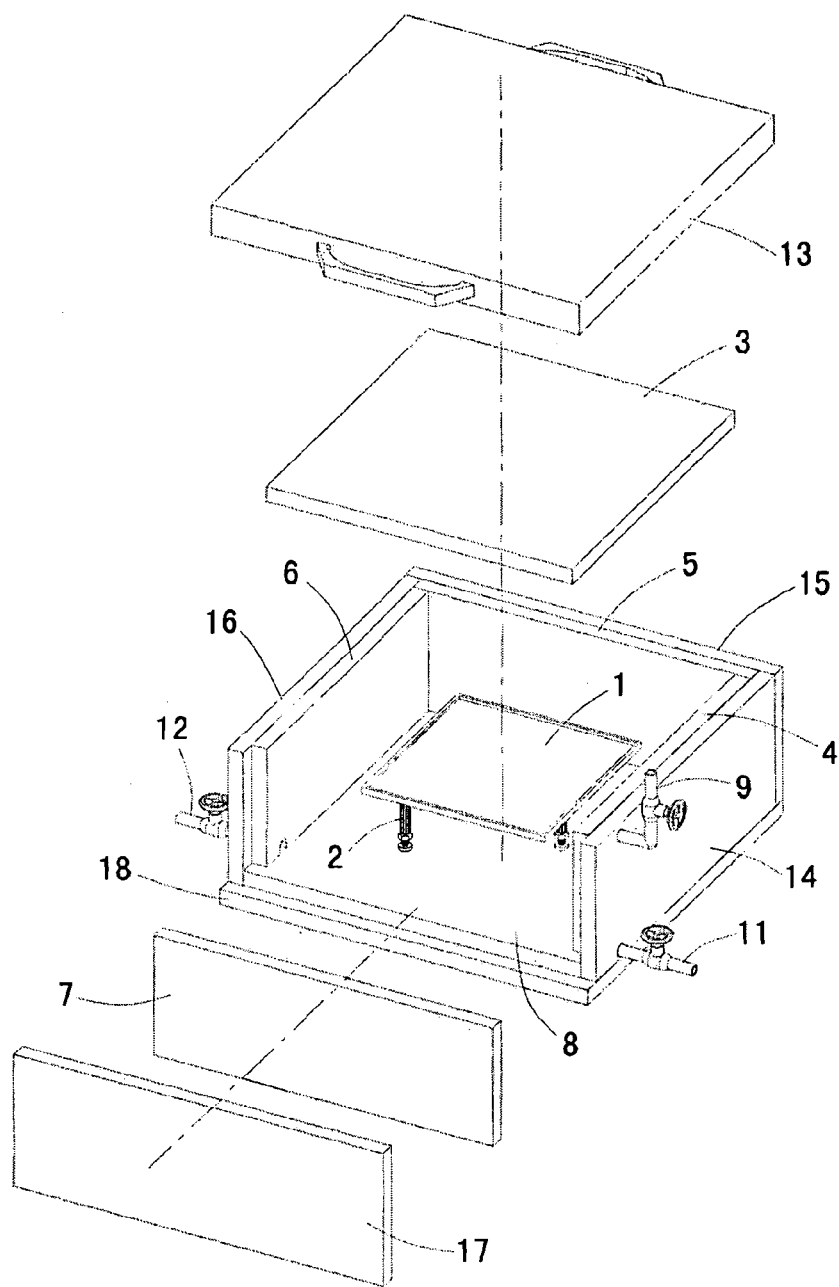

This invention involves a type of static and closed solution casting process.

EXISTING TECHNOLOGIES

The existing membrane preparation processes are usually dynamic and open such as stretching process, membrane extrusion process and flow casting process, but the techniques are complicated, the equipment is expensive, the membrane preparation cost is high, and the final membrane has the defects such as low crystallinity and anisotropic etc.

DETAILS OF THE INVENTION

The purpose of this invention is to provide a kind of static and closed solution casting process with simple technique, cheap equipment and low cost of membrane preparation, and the final membrane has the advantages such as high crystallinity and isotropic etc.

The purpose of this invention is achieved as followed:

A type of solution casting process, which is characterized in that: The process is the static and closed solution casting process, which comprises the following steps:

(A) Dissolve the solute in the solvent to prepare the casting solution.

(B) Place the membrane-casting plate with the area of "S" on the bracket, and adjust the bracket to make the membrane-casting plate horizontal. If not, the depth of the casting solution in the membrane-casting plate will become non-uniform, and it will make the thickness of the final membrane non-uniform.

(C) Pour the casting solution into membrane-casting plate such that the casting solution is uniformly spread out in the membrane-casting plate, and the depth of the casting solution is 0.1~2 cm.

When the depth of the casting solution is smaller than 0.1 cm, because of the action of surface tension, it is not easy for the casting solution to spread out uniformly in the membrane-casting plate, and it will cause the non-uniform for the thickness of the final membrane.

When the depth of the casting solution is more than 2 cm, the solution evaporation time will be too long, and the membrane-casting efficiency will be low.

(D) Arrange the heating arrangement with the area of "a" over the membrane-casting plate with the distance of "d1", the power density of the heating arrangement should be $0.1 \sim 0.5$ W/cm$^2$, and $0.2S^{1/2} \leq d1 \leq 0.4S^{1/2}$, $1.2S^{1/2} \leq a^{1/2} \leq 2S^{1/2}$.

When the power density of the heating arrangement is smaller than 0.1 W/cm$^2$, the temperature increasing of the casting solution in the membrane casting plate will be too slow.

When the power density of the heating arrangement is more than 0.5 W/cm$^2$, the temperature increasing of the casting solution in the membrane-casting plate will be too fast, and the solvent evaporation will be too fast, the solute molecule has no time to move and arrange into the crystal lattice, and it will cause low crystallinity of the final membrane. Because of high inertia, it is easy for the casting solution to boil partly resulting in beehive-like defective membrane. Because of high power density, the heating arrangement might bake burnt and yellow for the final membrane, and the quality of the final membrane might be reduced.

When $d1<0.2S^{1/2}$, the membrane-casting plate will be too close to the heating arrangement, and the expansion space for solvent evaporation will be too narrow, it will cause the slow evaporation of the solvent.

When $d1>0.4S^{1/2}$, the membrane-casting plate will be too far from the heating arrangement, and the heating space will too big, it will cause the slow temperature increasing of the membrane-casting solution.

When $a^{1/2}<1.2S^{1/2}$, the area of heating arrangement will be too small, it will cause insufficient heating of the casting solution at the edge area of the membrane-casting plate with low temperature and slow evaporation, and it will affect the membrane-casting.

When $a^{1/2}>2S^{1/2}$, the area of heating arrangement will be too big, and it will cause difficulty for the condensation of the solvent vapor.

(E) Arrange the cooling side plate around the membrane-casting plate with the distance of "d2", and arrange the cooling bottom plate below the membrane-casting plate with the distance of "d3", and $0.2S^{1/2} \leq d2 \leq 0.4S^{1/2}$, $0.2S^{1/2} \leq d3 \leq 0.4S^{1/2}$, supply the cooling liquor to the connected interlayer of the cooling side plate and the cooling bottom plate, the starting temperature of the cooling liquor is 1~50° C., the height of the cooling liquor in the interlayer of the cooling side plate is "h" and the thickness is "v", and $0.2S^{1/2} \leq h \leq 0.4S^{1/2}$, $0.05S^{1/2} \leq v \leq 0.15S^{1/2}$.

When $d2<0.2S^{1/2}$, the distance between the cooling side plate and the membrane-casting plate will be too close, it will remarkably reduce the temperature of the casting solution, the evaporation of the casting solution at the edge area of the membrane-casting plate will become slow, and it will affect the membrane-casting.

When $d2>0.4S^{1/2}$, because the heating space is too big, it will cause the slow temperature increasing for the casting solution in the membrane-casting plate.

When $d3<0.2S^{1/2}$, the cooling bottom plate will be too close to the membrane-casting plate, it will reduce the temperature of the membrane-casting plate and will cause slow temperature increasing of the casting solution in the membrane-casting plate; And because the cooling bottom plate is too close to the heating arrangement, it will cause re-evaporation of the solvent condensed at the cooling bottom plate.

When $d3>0.4S^{1/2}$, because the heating space is too big, it will cause the slow temperature increasing for the casting solution in the membrane-casting plate.

When $h<0.2S^{1/2}$, the cooling liquor will be too low, and it will cause difficulty for the condensation of the solvent vapor.

When $h>0.4S^{1/2}$, the cooling liquor will be too high, and it will cause slow temperature increasing for the casting solution in the membrane-casting plate.

When $v<0.05S^{1/2}$, the cooling liquor will be too thin, and it will cause difficulty for the condensation of the solvent vapor.

When $v>0.15S^{1/2}$, the cooling liquor will be too thick, which is not necessary.

(F) Enclose the membrane-casting plate, the bracket, the heating arrangement, the cooling side plate and the cooling bottom plate inside an insulated case made by heat insulator; if not, because of quick loss of heat, it will cause difficulty for the temperature increasing of the casting solution.

(G) Heat the casting solution in the membrane-casting plate by driving the heating arrangement, the heating temperature should be controlled to be 10~30° C. lower than the boiling point of the solvent and the heating time should be controlled to be 1~10.5 hours, so as to totally evaporate the solvent in the casting solution.

When the heating temperature is no more than 10° C. below the boiling point of the solvent, because of too fast evaporation of the solvent, the solute molecule has no time to move and arrange into the crystal lattice, and it will cause low crystallinity of the final membrane.

When the heating temperature is more than 30° C. below the boiling point of the solvent, not only the evaporation of the solvent will be too slow and the membrane-casting efficiency will be too low, but also because the temperature of the solute molecule is too low, and lack of enough thermal motion to move and arrange into the crystal lattice, it will cause low crystallinity of the final membrane.

When the heating time is no more than 1 hour, it will be difficult for the solvent to totally evaporate, and it will be difficult for the solute to crystallize and form into membrane.

When the heating time is more than 10.5 hours, not only the membrane-casting efficiency will be too low, but also because of long time baking at high-temperature, the final membrane might be baked burnt and yellow, and the quality of the final membrane might be reduced.

The heating time should be pro rata with the depth of the casting solution in the membrane-casting plate. When the depth of the casting solution is 0.1 cm, the heating time should be about 1 hour, including the temperature increasing time of about 0.5 hour and the evaporation time of about 0.5 hour. For each additional 0.1 cm increasing for the depth of the casting solution, the heating time should increase by about 0.5 hour. When the depth of the casting solution is increased to 2 cm, the heating time should be 10.5 hours.

(H) When the solvent of the casting solution finishes evaporation, continuously heat for 10~200 minutes, to make more solute molecule move and arrange into the crystal lattice and further to improve the crystallinity of the final membrane.

Continue heat for no more than 10 minutes, the solute molecule will not have enough time to move and arrange into the crystal lattice, and it will cause not high crystallinity of the final membrane.

Continue heat for more than 200 minutes, because of baking in high temperature for long time, the final membrane might be baked burnt and yellow, and the quality of the final membrane might be reduced.

The continuous heating time should be pro rata with the depth of the casting solution in the membrane-casting plate. When the depth of the casting solution is 0.1 cm, the heating time should be about 10 minutes. For each additional 0.1 cm increasing for the depth of the casting solution, the heating time should increase by about 10 minutes. When the depth of the casting solution increases to 2 cm, the heating time should be 200 minutes.

(I) Stop heating; and remove the condensed solvent from the cooling bottom plate, and peel the final membrane from the membrane-casting plate after the membrane-casting plate is cooled down.

The solute of the casting solution defined in Step (A) is perfluorinated proton exchange resin (density of 2.0 g/cm$^3$) with equivalent weight of EW=900~110 0 g/eq; the solvent is N,N-dimethylformamide (boiling point of 153° C. and density of 0.95 g/cm$^3$); the concentration of the casting solution is 1~5 wt %; the preparation of the casting solution should use closed reaction kettle with dissolving temperature of 200~220° C. and dissolving time of 4~6 hours.

When EW<900 g/eq, the mechanical strength of the final membrane will be too low.

When EW>1100 g/eq, the proton conductivity of the final membrane will be too low.

When the concentration of the casting solution is <1 wt %, the evaporation quantity of the solvent will be too much, and the membrane-casting efficiency will be too low.

When the concentration of the casting solution is >5 wt %, not only the solute can not be totally dissolved, but also the casting solution is easy to become jelly-like, which is not easy to be uniformly spread in the membrane casting plate, and it will easily cause the non-uniformity for the thickness of the final membrane.

Place the level gauge in the defined membrane-casting plate, adjust the height of the fulcrum of the bracket to make the level bubble of the level gauge at zero point in the two mutual vertical directions in the surface of the membrane-casting surface, to keep the membrane-casting plate horizontal.

The defined heating arrangement is composed by many pieces of far infrared quartz heating tubes arranged in parallel.

The far infrared quartz heating tube has the advantages such as strong anti-corrosion capacity, stable radiation efficiency, high heat exchanging efficiency, fast thermal response speed, small thermal inertia and facilitating motion and crystallization of the solute molecule.

In the defined Step (G), the heating temperature of the heating arrangement is automatically controlled by the temperature controller; the temperature-measurement sensor is placed on the edge of the membrane-casting plate to measure the heating temperature.

This invention has the following positive and advantageous effects:

This static and closed solution casting process has simple technique, cheap equipment and low cost of membrane preparation, and the final membrane has the advantages such as high crystallinity and isotropic etc.

In this invention, the membrane-casting is processed by slowly evaporation and crystallization of the casting solution at the heating temperature which is 10~30° C. below the boiling point of the solvent; during the crystallization of the solute, the membrane-casting plate and the casting solution is in the static and closed space, under the radiation heating by the top heating arrangement, the evaporated solvent saturated vapor spreads around and envelope the casting solution; the solvent saturated vapor which spread further meets the cooling side plate, and cools down & condenses into liquid solvent at the surface of the cooling side plate and converge on the cooling bottom plate. Because the casting solution and the solvent vapor are in the status of nearly dynamic balance, the solvent of the casting solution is slowly evaporated and reduced, and the concentration of the solute in the casting solution is slowly increased, further slowly get crystallized and formed into membrane; besides, after the solvent finishes evaporation, continuously heat for sometime, the solute molecule has sufficient time to move and arrange into the crystal lattice, so the final membrane has high crystallinity.

The traditional open stretching process, membrane extrusion process and flow casting process have MD (Machine Direction) and TD (Transverse Direction), the crystallization of the solute is interfered by the outside mechanical force, so that it causes anisotropic of the final membrane. This invention is a type of static and closed solution casting process, the membrane-casting plate and casting solution are in stationary state in a static and closed space; the crystallization of the solute is not interfered by outside mechanical force without special direction of orientation, so the final membrane is isotropic.

In the static and closed solution casting process of this invention, the far infrared radiation heating arrangement with adequate power density is arranged on top of the membrane casting plate, and the cooling side plate is arranged in the surrounding of the membrane-casting plate; though the temperature of the casting solution at the central area of the membrane-casting plate is higher with higher vapor pressure and bigger vapor molecule density, the solvent vapor molecule when spreading outwards will not only be blocked by the solvent vapor molecule on top of the edge area of the membrane-casting plate, but also need relatively longer displacement, so as to spread to the surface of the cooling side plate to condense around the membrane-casting plate; though the temperature of the casting solution at the edge area of the membrane-casting plate is lower with lower vapor pressure and lower vapor molecule density, the evaporated solvent vapor molecule only need relatively shorter displacement to spread to the surrounding cooling side plate surface to condense without block. So, when the distance between the membrane-casting plate and the heating arrangement "d1", the distance between the membrane-casting plate and the cooling side plate "d2", the distance between the membrane-casting plate and the cooling bottom plate "d3", the height of the cooling liquor "h", the thickness "v" and the heating arrangement area "a" adequately matches the membrane-casting plate area "S", especially when $0.2S^{1/2} \leq d1 \leq 0.4S^{1/2}$, $1.2S^{1/2} \leq a^{1/2} \leq 2S^{1/2}$, $0.2S^{1/2} \leq d2 \leq 0.45S^{1/2}$, $0.2S^{1/2} \leq d3 \leq 0.4S^{1/2}$, $0.2S^{1/2} h \leq 0.4S^{1/2}$, $0.05S^{1/2} \leq v 0.15S^{1/2}$, the evaporation and condensation speed of the casting solution at the middle area and edge area of the membrane-casting plate will become consistent, so that the thickness of the middle area and edge area of the final membrane will become consistent.

FIGURE DESCRIPTION

Figure 2:
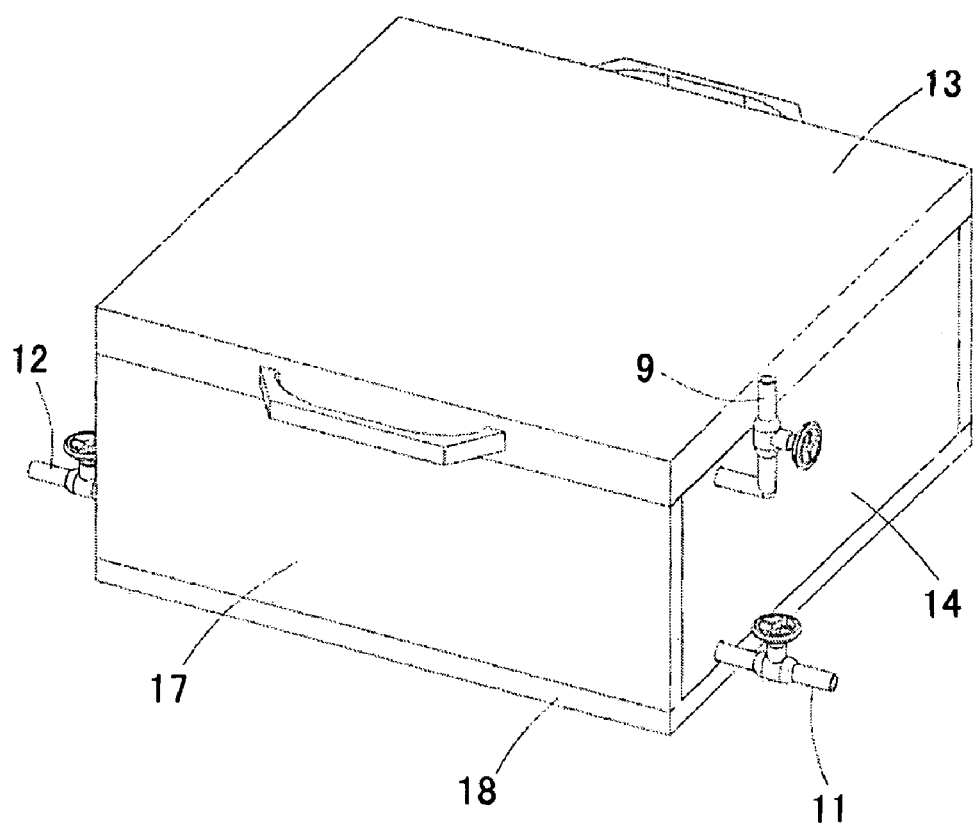
Figure 3:
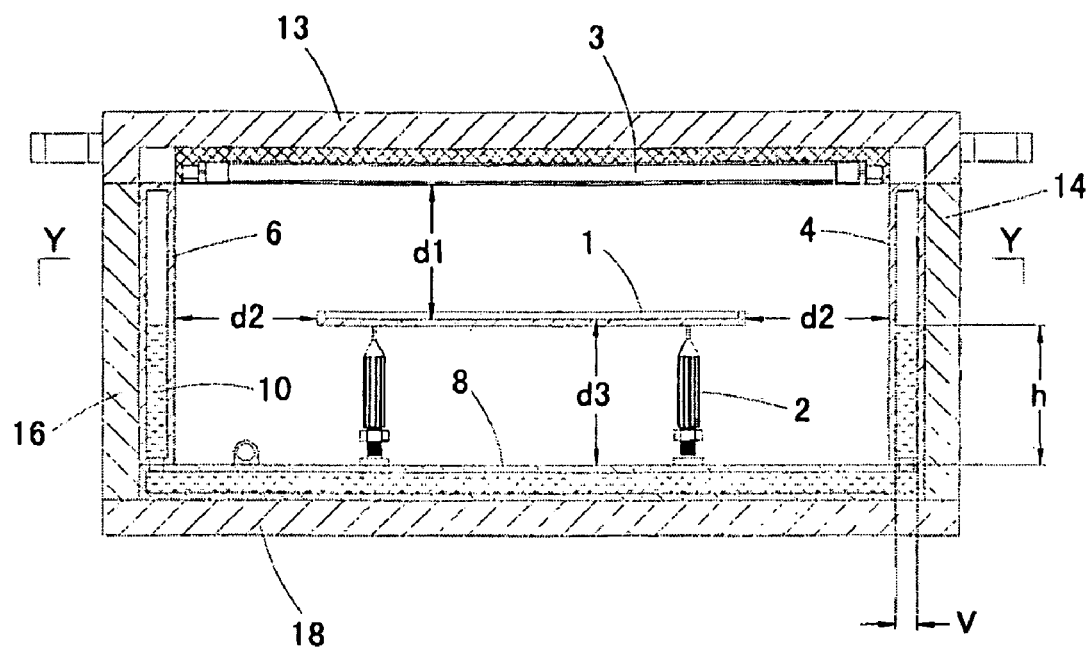
Figure 4:
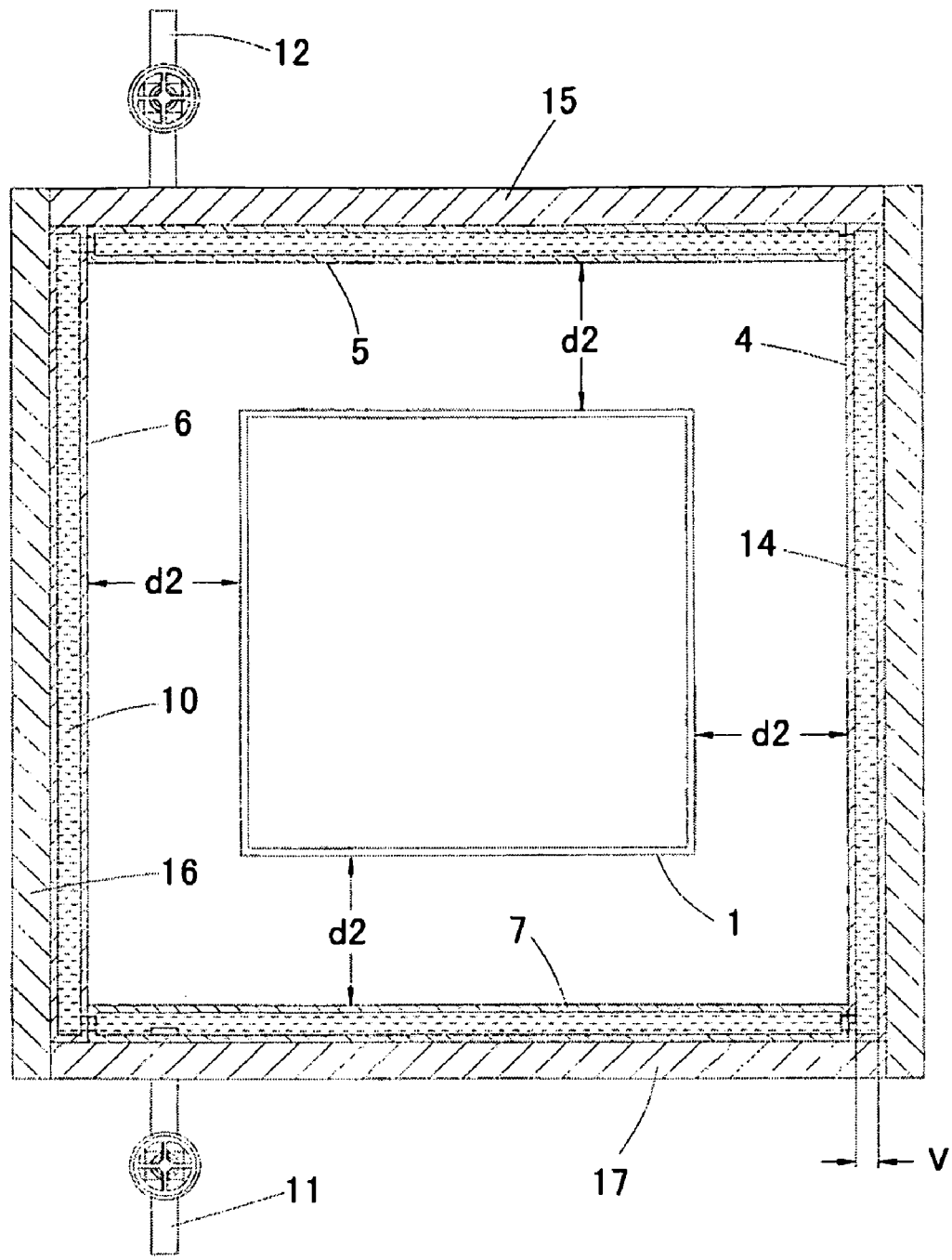
Figure 5:
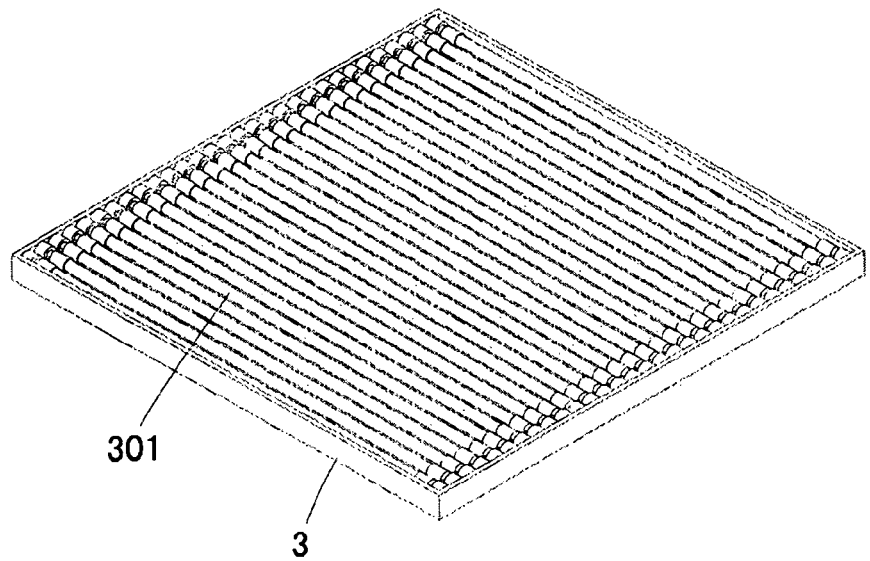
Figure 6:
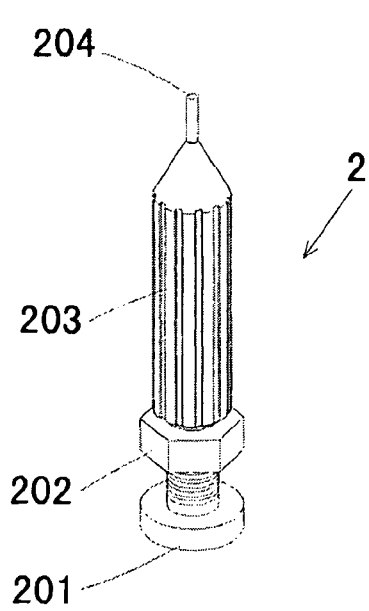
Figure 7:
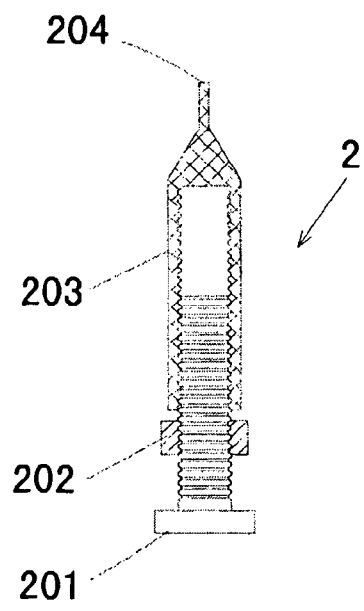

FIG. 1 is the structural sketch of the devices for this solution casting process.
FIG. 2 is the external shape sketch of the devices used in FIG. 1 after installation.
FIG. 3 is the sectional view figure of FIG. 2.
FIG. 4 is the Y-Y sectional view figure of FIG. 3.
FIG. 5 is the rear view figure of the heating arrangement in FIG. 1.
FIG. 6 is the enlarged figure of the bracket in FIG. 1.
FIG. 7 is the sectional view drawing of FIG. 6.

THE IMPLEMENTATION EXAMPLE OF THIS INVENTION

Implementation Example I

This Implementation Example is the fabrication of the perfluorinated proton exchange membrane of 40 cm×40 cm×0.0005 cm, please refer to FIG. 1, FIG. 2, FIG. 3, FIG. 4, FIG. 5, FIG. 6 and FIG. 7, and this process comprises the following detailed steps:

(A) Put 3 g perfluorinated proton exchange resin with equivalent weight of EW=900 g/eq and 297 g (about 313 mL) N,N-dimethylformamide into 0.5 L closed reaction kettle, heating, stirring and dissolving with dissolving temperature of 200° C. and dissolving time of 4 hours, to make the perfluorinated proton exchange resin dissolved in the N,N-dimethylformamide, and to prepare about 310 mL of casting solution with concentration of 1 wt %.

(B) Put membrane-casting plate "1" with area of S=40 cm×40 cm on bracket "2", place the level gauge in membrane-casting plate "1", adjust the height of the fulcrum of bracket "2" making the level bubble of the level gauge at zero point in the two mutual vertical directions in the surface of the membrane-casting surface, so as to keep the membrane-casting plate horizontal. There are three brackets "2" with same structure. Please refer to FIG. 6 and FIG. 7, each bracket "2" comprises of screw stem "201", nut "202" and swivel nut "203", nut "202" is connected to the bottom of screw stem "201", swivel nut "203" is connected to the top of screw stem "201", fulcrum "204" is on top of swivel nut "203", and fulcrum "204" is for supporting membrane-casting plate "1", rotate swivel nut "203" and the height of fulcrum "204" can be adjusted, nut "202" is used to lock & position swivel nut "203".

(C) Pour 160 g (about 168 mL) casting solution with concentration of 1 wt % into membrane-casting plate "1", because of the action of surface tension, the casting solution will naturally flow but will not easily spread out in membrane-casting plate "1" uniformly, especially the edge area of membrane-casting plate "1"; The casting solution can uniformly spread out in membrane-casting plate "1" in the way that slightly leaning membrane-casting plate "1" in each direction, and the depth of the casting solution is about 0.105 cm.

(D) Arrange heating arrangement "3" with area of a=50 cm×50 cm over membrane-casting plate "1" with distance of d1=8 cm, the power density of heating arrangement "3" is 0.1 W/cm² with heating power of 0.25 kW, which comprises ten pieces of far infrared quartz heating tube "301" with power of 25 W and length of 50 cm arranged in parallel with equal gap of 5.3 cm.

The heating temperature of heating arrangement "3" is automatically controlled by the temperature controller; the temperature-measurement sensor is placed on the edge of membrane-casting plate "1" to measure the heating temperature.

(E) Arrange cooling side plate "4", "5", "6", "7" around membrane-casting plate "1" with the distance of d2=8 cm; supply the water of room temperature into the connected interlayer as cooling liquor between cooling side plate "4", "5", "6", "7" and cooling bottom plate "8", the cooling liquor in the interlayer of cooling side plate "4", "5", "6", "7" has the height of h=8 cm, and thickness of v=2 cm, the cooling liquor in the interlayer of cooling bottom plate "8" has the thickness of 2 cm.

The function of cooling side plate "4", "5", "6", "7" is to condense the solute vapor evaporated from membrane-casting plate "1".

The function of cooling bottom plate "8" is to keep the condensed solute in liquid status and no longer get evaporated.

Liquor-adding opening "9" is installed on the top of cooling side plate "4", and cooling liquor "10" is added through liquor-adding opening "9".

Liquor-outlet opening "11" is installed on the bottom of cooling side plate "4", to adjust the liquor surface height of cooling liquor.

Liquor-discharging opening "12" is installed on the bottom of cooling side plate "6", to discharge the liquid solvent condensed by the cooling of cooling side plate "4", "5", "6", "7".

(F) Enclose membrane-casting plate "1", bracket "2", heating arrangement "3", cooling side plate "4", "5", "6", "7" and cooling bottom plate "8" inside an insulated case made by heat insulator "13", "14", "15", "16", "17", "18", and heat insulator "13", "14", "15", "16", "17", "18" are glass cotton or asbestos.

(G) Heat the casting solution in membrane-casting plate "1" by driving heating arrangement "3", the heating temperature should be controlled to be 143° C. which is 10° C. lower than the boiling point of the solvent and the heating time should be 1 hour, so as to totally evaporate the solvent in the casting solution.

During heating, the evaporated solvent vapor expands towards the surrounding and condenses into liquid solvent after cooled down by cooling side plate "4", "5", "6", "7". With the solvent of the casting solution slowly evaporated and reduced, the concentration of the solute in the casting solution is slowly increased, further slowly get crystallized and formed into membrane;

(H) When the solvent of the casting solution finishes evaporation, continuously heat for 10 minutes, to make more solute molecule move and arrange into the crystal lattice and further to improve the crystallinity of the final membrane.

(I) Stop heating; and remove the condensed solvent from the cooling bottom plate "8" through liquor-discharging opening "12", and peel the final membrane of 40 cm×40 cm×0.0005 cm from membrane-casting plate "1" after membrane-casting plate "1" is cooled down.

Implementation Example II

This Implementation Example is the fabrication of the perfluorinated proton exchange membrane of 60 cm×60 cm×0.015 cm, please refer to FIG. 1, FIG. 2, FIG. 3, FIG. 4, FIG. 5, FIG. 6 and FIG. 7, and this process comprises the following detailed steps:

(A) Put 0.3 kg perfluorinated proton exchange resin with equivalent weight of EW=1000 g/eq and 9.7 kg (about 10.2 L) N,N-dimethylformamide into 15 L closed reaction kettle, heating, stirring and dissolving with dissolving temperature of 210° C. and dissolving time of 5 hours, to make the perfluorinated proton exchange resin dissolved in the N,N-dimethylformamide, and to prepare about 10 L of casting solution with concentration of 3 wt %.

(B) Put membrane-casting plate "1" with area of S=60 cm×60 cm on bracket "2", place the level gauge in membrane-casting plate "1", adjust the height of the fulcrum of bracket "2" making the level bubble of the level gauge at zero point in the two mutual vertical directions in the surface of the membrane-casting surface, so as to keep membrane-casting plate "1" horizontal. There are three brackets "2" with same structure. Please refer to FIG. 6 and FIG. 7, each bracket "2" comprises of screw stem "201", nut "202" and swivel nut "203", nut "202" is connected to the bottom of screw stem "201", swivel nut "203" is connected to the top of screw stem "201", fulcrum "204" is on top of swivel nut "203", and fulcrum "204" is for supporting membrane-casting plate "1", rotate swivel nut "203" and the height of fulcrum "204" can be adjusted, nut "202" is used to lock & position swivel nut "203".

(C) Pour 3.6 kg (about 3.79 L) casting solution with concentration of 3 wt % into membrane-casting plate "1", such that the casting solution is uniformly spread out in membrane-casting plate by naturally flowing and the depth of the casting solution is about 1.05 cm.

(D) Arrange heating arrangement "3" with area of a=100 cm×100 cm over membrane-casting plate "1" with distance of d1=18 cm, the power density of heating arrangement "3" is 0.3 W/cm² with heating power of 3 kW, which comprises thirty pieces of far infrared quartz heating tube "301" with power of 100 W and length of 100 cm arranged in parallel with equal gap of 3.4 cm.

The heating temperature of heating arrangement "3" is automatically controlled by the temperature controller; the temperature-measurement sensor is placed on the edge of membrane-casting plate "1" to measure the heating temperature.

(E) Arrange the cooling side plate "4", "5", "6", "7" around the membrane-casting plate with the distance of d2=18 cm; supply the water of room temperature into the connected interlayer as cooling liquor between cooling side plate "4", "5", "6", "7" and cooling bottom plate "8", the cooling liquor in the interlayer of cooling side plate "4", "5", "6", "7" has the height of h=18 cm, and thickness of v=6 cm, the cooling liquor in the interlayer of the cooling bottom plate "8" has the thickness of 6 cm.

The function of cooling side plate "4", "5", "6", "7" is to condense the solute vapor evaporated from membrane-casting plate "1".

The function of cooling bottom plate "8" is to keep the condensed solute in liquid status and no longer get evaporated.

Liquor-adding opening "9" is installed on the top of cooling side plate "4", and cooling liquor "10" is added through liquor-adding opening "9".

Liquor-outlet opening "11" is installed on the bottom of cooling side plate "4", to adjust the liquor surface height of cooling liquor.

Liquor-discharging opening "12" is installed on the bottom of cooling side plate "6", to discharge the liquid solvent condensed by the cooling of cooling side plate "4", "5", "6", "7".

(F) Enclose membrane-casting plate "1", bracket "2", heating arrangement "3", cooling side plate "4", "5", "6", "7" and cooling bottom plate "8" inside an insulated case made by heat insulator "13", "14", "15", "16", "17", "18", and heat insulator "13", "14", "15", "16", "17", "18" are glass cotton or asbestos.

(G) Heat the casting solution in membrane-casting plate "1" by driving heating arrangement "3", the heating temperature should be controlled to be 133° C. which is 20° C. lower than the boiling point of the solvent and the heating time should be 5.5 hour, so as to totally evaporate the solvent in the casting solution.

During heating, the evaporated solvent vapor expands towards the surrounding and condenses into liquid solvent after cooled down by cooling side plate "4", "5", "6", "7". With the solvent of the casting solution slowly evaporated and reduced, the concentration of the solute in the casting solution is slowly increased, further slowly get crystallized and formed into membrane;

(H) When the solvent of the casting solution finishes evaporation, continuously heat for 105 minutes, to make more solute molecule move and arrange into the crystal lattice and further to improve the crystallinity of the final membrane.

(I) Stop heating; and remove the condensed solvent from cooling bottom plate "8" through liquor-discharging opening "12", and peel the final membrane of 60 cm×60 cm×0.015 cm from membrane-casting plate "1" after membrane-casting plate "1" is cooled down.

Implementation Example III

This Implementation Example is the fabrication of the perfluorinated proton exchange membrane of 100 cm×100 cm×0.0475 cm, please refer to FIG. 1, FIG. 2, FIG. 3, FIG. 4, FIG. 5, FIG. 6 and FIG. 7, and this process comprises the following detailed steps:

(A) Put 5 kg perfluorinated proton exchange resin with equivalent weight of EW=1100 g/eq and 100 L (about 95 kg) N,N-dimethylformamide into 150 L closed reaction kettle, heating, stirring and dissolving with dissolving temperature of 220° C. and dissolving time of 6 hours, to make the perfluorinated proton exchange resin dissolved in the N,N-dimethylformamide, and to prepare about 100 L of casting solution with concentration of 5 wt %.

(B) Put membrane-casting plate "1" with area of S=100 cm×100 cm on the bracket "2", place the level gauge in membrane-casting plate "1", adjust the height of the fulcrum of bracket "2" making the level bubble of the level gauge at zero point in the two mutual vertical directions in the surface of the membrane-casting surface, so as to keep membrane-casting plate "1" horizontal. There are three brackets "2" with same structure. Please refer to FIG. 6 and FIG. 7, each bracket "2" comprises of screw stem "201", nut "202" and swivel nut "203", nut "202" is connected to the bottom of screw stem "201", swivel nut "203" is connected to the top of screw stem "201", fulcrum "204" is on top of swivel nut "203", and fulcrum "204" is for supporting membrane-casting plate "1", rotate swivel nut "203" and the height of fulcrum "204" can be adjusted, nut "202" is used to lock & position swivel nut "203".

(C) Pour 19 kg (about 20 L) casting solution with concentration of 5 wt % into membrane-casting plate "1", such that the casting solution is uniformly spread out in membrane-casting plate "1" by naturally flowing and the depth of the casting solution is about 2 cm.

(D) Arrange heating arrangement "3" with area of a=200 cm×200 cm over membrane-casting plate "1" with distance of d1=40 cm, the power density of heating arrangement "3" is 0.5 W/cm² with heating power of 20 kW, which comprises one hundred pieces of far infrared quartz heating tube "301" with power of 200 W and length of 200 cm arranged in parallel with equal gap of 2 cm.

The heating temperature of heating arrangement "3" is automatically controlled by the temperature controller; the temperature-measurement sensor is placed on the edge of the membrane-casting plate to measure the heating temperature.

(E) Arrange cooling side plate "4", "5", "6", "7" around membrane-casting plate "1" with the distance of d2=40 cm; supply the water of room temperature into the connected interlayer as cooling liquor between cooling side plate "4", "5", "6", "7" and cooling bottom plate "8", the cooling liquor in the interlayer of cooling side plate "4", "5", "6", "7" has the height of h=40 cm, and thickness of v=15 cm, the cooling liquor in the interlayer of the cooling bottom plate "8" has the thickness of 15 cm.

The function of cooling side plate "4", "5", "6", "7" is to condense the solute vapor evaporated from membrane-casting plate "1".

The function of cooling bottom plate "8" is to keep the condensed solute in liquid status and no longer get evaporated.

The liquor-adding opening "9" is installed on the top of cooling side plate "4", and cooling liquor "10" is added through liquor-adding opening "9".

Liquor-outlet opening "11" is installed on the bottom of cooling side plate "4", to adjust the liquor surface height of cooling liquor.

Liquor-discharging opening "12" is installed on the bottom of cooling side plate "6", to discharge the liquid solvent condensed by the cooling of cooling side plate "4", "5", "6", "7".

(F) Enclose membrane-casting plate "1", bracket "2", heating arrangement "3", cooling side plate "4", "5", "6", "7" and cooling bottom plate "8" inside an insulated case made by heat insulator "13", "14", "15", "16", "17", "18", and heat insulator "13", "14", "15", "16", "17", "18" are glass cotton or asbestos.

(G) Heat the casting solution in membrane-casting plate "1" by driving heating arrangement "3", the heating temperature should be controlled to be 123° C. which is 30° C. lower than the boiling point of the solvent and the heating time should be 10.5 hour, so as to totally evaporate the solvent in the casting solution.

During heating, the evaporated solvent vapor expands towards the surrounding and condenses into liquid solvent after cooled down by cooling side plate "4", "5", "6", "7". With the solvent of the casting solution slowly evaporated and reduced, the concentration of the solute in the casting solution is slowly increased, further slowly get crystallized and formed into membrane;

(H) When the solvent of the casting solution finishes evaporation, continuously heat for 200 minutes, to make more solute molecule move and arrange into the crystal lattice and further to improve the crystallinity of the final membrane.

(I) Stop heating; and remove the condensed solvent from cooling bottom plate "8" through liquor-discharging opening "12", and peel the final membrane of 100 cm×100 cm×0.0475 cm from membrane-casting plate "1" after membrane-casting plate "1" is cooled down.

In the static and closed solution casting process of this invention, the far infrared radiation heating arrangement with adequate power density is arranged on top of the membrane casting plate, and the cooling side plate is arranged in the surrounding of the membrane-casting plate; though the temperature of the casting solution at the central area of the membrane-casting plate is higher with higher vapor pressure and bigger vapor molecule density, the solvent vapor molecule when spreading outwards will not only be blocked by the solvent vapor molecule on top of the edge area of the membrane-casting plate, but also need relatively longer displacement, so as to spread to the surface of the cooling side plate to condense around the membrane-casting plate; though the temperature of the casting solution at the edge area of the membrane-casting plate is lower with lower vapor pressure and lower vapor molecule density, the evaporated solvent vapor molecule only need relatively shorter displacement to spread to the surrounding cooling side plate surface to condense without block. So, when the distance between the membrane-casting plate and the heating arrangement "d1" the distance between the membrane-casting plate and the cooling side plate "d2", the distance between the membrane-casting plate and the cooling bottom plate "d3", the height of the cooling liquor "h", the thickness "v" and the heating arrangement area "a" adequately matches the membrane-casting plate area "S", especially when $0.2S^{1/2} \leq d1 \leq 0.4S^{1/2}$, $1.2S^{1/2} \leq a^{1/2} \leq 2S^{1/2}$, $0.2S^{1/2} \leq d2 \leq 0.4S^{1/2}$, $0.2S^{1/2} \leq d3 \leq 0.4S^{1/2}$, $0.2S^{1/2} \leq h \leq 0.4S^{1/2}$, $0.05S^{1/2} \leq v \leq 0.015S^{1/2}$, the evaporation and condensation speed of the casting solution at the middle area and edge area of the membrane-casting plate will become consistent, so that the thickness of the middle area and edge area of the final membrane will become consistent.

The invention claimed is:

1. A solution casting process comprising:
    (A) dissolving a solute in a solvent to prepare a casting solution;
    (B) placing a membrane-casting plate with an area of "S" on a bracket, and adjusting the bracket to make the membrane-casting plate horizontal;
    (C) pouring the casting solution into the membrane-casting plate such that the casting solution is uniformly spread out in the membrane-casting plate, and a depth of the casting solution is 0.1 to 2 cm;

(D) arranging a heating arrangement with an area of "a" over the membrane-casting plate with a distance of "d1", a power density of the heating arrangement should be 0.1 to 0.5 W/cm2, and $0.2S^{1/2} \leq d1 \leq 0.4S^{1/2}$, $1.2S^{1/2} \leq a^{1/2} \leq 2S^{1/2}$;

(E) arranging a cooling side plate around the membrane-casting plate with a distance of "d2", arranging a cooling bottom plate below the membrane-casting plate with a distance of "d3", and $0.2S^{1/2} \leq d2 \leq 0.4S^{1/2}$, $0.2S^{1/2} \leq d3 \leq 0.4S^{1/2}$, supplying a cooling liquor to a connected interlayer of the cooling side plate and the cooling bottom plate, a starting temperature of the cooling liquor is 1 to 50° C., a height of the cooling liquor in the interlayer of the cooling side plate is "h" and a thickness is "v", and $0.2S^{1/2} \leq h \leq 0.4S^{1/2}$, $0.05S^{1/2} \leq v \leq 0.15S^{1/2}$;

(F) enclosing the membrane-casting plate, the bracket, the heating arrangement, the cooling side plate and the cooling bottom plate inside an insulated case made by heat insulator;

(G) heating the casting solution in the membrane-casting plate by driving the heating arrangement, the heating temperature should be controlled to be 10 to 30° C. lower than a boiling point of the solvent and a heating time should be controlled to be 1 to 10.5 hours, so as to totally evaporate the solvent in the casting solution;

(H) when the solvent of the casting solution finishes evaporation, continuously heating for 10 to 200 minutes, to make more solute molecule move and arrange into a crystal lattice and further to improve crystallinity of a final membrane; and (I) stopping heating; removing a condensed solvent from the cooling bottom plate, and peeling the final membrane from the membrane-casting plate after the membrane-casting plate is cooled down.

2. The solution casting process according to claim 1, wherein the solute of the casting solution is perfluorinated proton exchange resin with equivalent weight of EW=900 to 1100 g/eq; the solvent is N,N-dimethylformamide; the concentration of the casting solution is 1 to 5 wt %; the preparation of the casting solution should use closed reaction kettle with dissolving temperature of 200 to 220° C. and dissolving time of 4 to 6 hours.

3. The solution casting process according to claim 1, wherein the membrane-casting plate is made of float glass.

4. The solution casting process according to claim 1, further comprising: placing a level gauge in the defined membrane-casting plate, and adjusting a height of the fulcrum of the bracket to make a level bubble of the level gauge at zero point in two mutual vertical directions in a surface of the membrane-casting surface, to keep the membrane-casting plate horizontal.

5. The solution casting process according to claim 1, wherein the heating arrangement is composed by many pieces of far infrared quartz heating tubes arranged in parallel.

6. The solution casting process according to claim 1, wherein heating temperature of the defined heating arrangement is automatically controlled by the temperature controller; a temperature-measurement sensor is placed on an edge of the membrane-casting plate to measure the heating temperature.

* * * * *